United States Patent [19]
Komoto et al.

[11] Patent Number: 5,962,818
[45] Date of Patent: Oct. 5, 1999

[54] TOP SCALE BALANCE

[75] Inventors: Akira Komoto, Shiga; Kunio Shimauchi, Kyoto; Kazuo Nishibayashi, Kyoto; Akihiro Fukai, Kyoto, all of Japan

[73] Assignee: Shimadzu Corporation, Kyoto, Japan

[21] Appl. No.: 08/538,776

[22] Filed: Oct. 3, 1995

[30] Foreign Application Priority Data

Oct. 5, 1994 [JP] Japan .................................. 6-241119

[51] Int. Cl.$^6$ .............................. G01G 3/08; G01G 3/14; G01G 21/12
[52] U.S. Cl. .................................. 177/229; 177/210 EM; 177/255
[58] Field of Search .................................. 177/229, 255, 177/164, 210 EM

[56] References Cited

U.S. PATENT DOCUMENTS

| | | | |
|---|---|---|---|
| 4,184,557 | 1/1980 | Kunx | 177/229 |
| 4,482,022 | 11/1984 | Komoto | 177/25 |
| 4,485,881 | 12/1984 | Tramposch et al. | 177/211 |
| 4,653,600 | 3/1987 | Melcher et al. | 177/229 |
| 4,798,251 | 1/1989 | Maaz et al. | 177/229 |
| 5,052,505 | 10/1991 | Naito et al. | 177/229 |
| 5,338,902 | 8/1994 | Uchiike | 177/255 |

Primary Examiner—Ronald Stright
Assistant Examiner—Michael J Hayes
Attorney, Agent, or Firm—Nikaido, Marmelstein, Murray & Oram LLP

[57] ABSTRACT

In a top scale balance which has a Roberval's chain 10 and a load weight transmitting lever 30 and in which a movable post 13 of the Roberval's chain 10 is connected to a point of force 32 of the lever 30 through an elastic connection fulcrum 51, a horizontal member 12 nearer to the elastic connection fulcrum 51, out of upper and lower horizontal members 11, 12 of the Roberval's chain 10, is greater in rigidity than the other horizontal member 11. Alternately, the upper and lower horizontal members 11, 12 are equal in rigidity and the elastic connection fulcrum 51 is positioned, in the vertical direction, at the center between the upper and lower horizontal members 11, 12. Such an arrangement prevents or reduces the movement of the elastic connection fulcrum 51 in the back-and-forth direction due to an offset placed load. Thus, even though the top scale balance is made in a compact and thin design with the lever ratio increased, the top scale balance is high in precision with a less offset position error.

9 Claims, 8 Drawing Sheets

TOP SCALE BALANCE

BACKGROUND OF THE INVENTION

The present invention relates to a top scale balance and more particularly to a top scale balance having a Roberval's chain and a lever mechanism for load transmission. It is noted that the present invention can be applied not only to a so-called electronic balance having a load sensing portion of the electromagnetic equilibrium type, but also to a so-called scale having a load cell or the like serving as a load sensing portion.

FIGS. 9(A) and (B) are plan and side views of a conventional top scale balance, and FIG. 10 shows the mechanism thereof. In such a top scale balance, a sample scale 20 is supported through a Roberval's chain 10 (which is also called a parallel guide). This restrains the sample scale 20 from being transversely displaced and/or inclined such that the sample scale 20 is vertically moved as horizontally maintained. This prevents the occurrence of an error due to offset placing of a sample on the sample scale 20, i.e., a so-called offset position error (which is also called a four-corner error).

The Roberval's chain 10 has a structure in which a movable post 13 is connected to a stationary post 14 through two parallel horizontal members, i.e., upper and lower horizontal members 11, 12 each provided at both ends thereof with flexible portions 11a, 11b, 12a, 12b which serve as hinge portions. The sample scale 20 is supported by the movable post 13. A load acting on the sample scale 20 will be transmitted, through a lever 30 connected to the movable post 13, to a load sensing portion 40 such as a load cell, an electromagnetic equilibrium mechanism or the like.

The lever 30 is generally supported by an elastic fulcrum 31 and provided at one end thereof with a point of force 32 which is connected to the movable post 13 through a connecting piece 50. The lever 30 has the other end connected to the load sensing portion 40 such that a load to be measured acting on the sample scale 20 is to be transmitted to the load sensing portion 40. The point of force 32 of the lever 30 is flexible in the directions shown by arrows R in FIG. 10 (in the oscillating directions of the lever 30). For connection between the connecting piece 50 and the movable post 13, there is formed an elastic connection fulcrum 51. Thus, provision is made such that the elastic connection fulcrum 51 and the flexible point of force 32 absorb not only a slight displacement of the movable post 13 in the back-and-forth direction due to the application of a load onto the sample scale 20, but also a slight displacement of the point of force 32 in the back-and-forth direction due to the inclination of the lever 30.

In the Roberval's chain 10 having the arrangement above-mentioned, the parallelism between the upper and lower horizontal members 11, 12 is generally important. More specifically, only under the conditions that the upper and lower horizontal members 11, 12 are precisely parallel to each other, the offset position error of a load on the sample scale 20 can be canceled. That is, unless the horizontal members 11, 12 are precisely adjusted such that the distances H, H' in FIG. 9(B) are precisely equal to each other, an offset position error is produced. Particularly, a precise electronic balance of the electromagnetic equilibrium type or the like, requires precision on the order of not greater than $\mu$m. Thus, such adjustment is not on the level which can be achieved by measuring the distances H and H'. In an actual adjustment, the parallelism between the horizontal members 11, 12 is to be fine-adjusted such that, when a load is applied to the sample scale 20 at each of a variety of positions thereof, the measured value at each of the positions undergoes no change.

As a mechanism for adjusting the parallelism of the Roberval's chain 10, there is generally known a mechanism as shown in FIG. 11. More specifically, with the use of an adjusting arm 71 having one end resiliently secured to the stationary post 14 and the other end which is free, the vertical movement of the arm 71 by rotating an adjusting screw 72 is reduced to $d_2/d_1$, thereby to finely move an attachment portion F of the horizontal member 11 or 12 (e.g., Japanese Utility Model Laid-Open Publication No. 63-308522). Also, there are known a mechanism in which a differential screw is used as the adjusting screw 72 (Japanese Utility Model Laid-Open Publication No. 63-35924), a mechanism in which one horizontal member attachment portion F is finely moved with respect to the stationary post 14 with the use of a wedge principle (Japanese Utility Model Laid-Open Publication No. 62-40531) and the like.

With the recent demand for a smaller and thinner balance, it becomes necessary to increase, as compared with a prior art balance, the lever ratio to measure a large load with a small mechanism. However, if a conventional arrangement is adopted as it is and the lever ratio is simply increased to reduce the balance in size, the offset position error becomes great, failing to satisfy the balance specifications.

More specifically, when the lever ratio is increased to shorten the distance $L_1$ between the elastic fulcrum 31 and the point of force 32 of the lever 30 to about 1 mm or less, the offset position error particularly in the back-and-forth direction varies dependent on the magnitude of a load. Accordingly, even though the offset position error is precisely adjusted for a certain load using the adjusting mechanism as above-mentioned, there is produced an offset position error for another load. This prevents such a balance from being put to practical use.

OBJECT AND SUMMARY OF THE INVENTION

It is an object of the present invention to provide a top scale balance which can solve the problems above-mentioned of the conventional top scale balance, and in which, even though the mechanism is made in a compact and thin design with the lever ratio increased, a change in offset position error dependent on the magnitude of a load is small, thus enabling the top scale balance to be made highly precise in a compact and thin design with a less offset position error.

Figure 1:
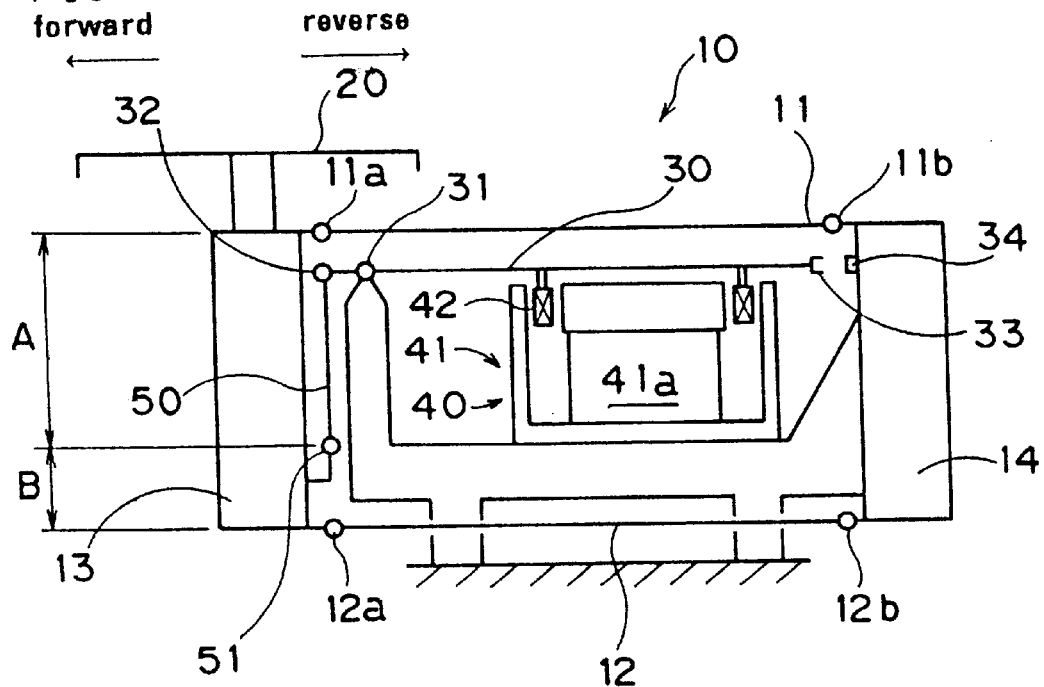
FIG. 1 is a side view of a mechanism illustrating an embodiment in which a first invention is applied to an electronic balance of the electromagnetic equilibrium type.

To achieve the object above-mentioned, a first invention provides a top scale balance comprising, as shown in FIG. 1: a Roberval's chain 10 having (i) two, upper and lower, parallel horizontal members 11, 12 each provided at both ends thereof with flexible portions, (ii) a movable post 13 and (iii) a stationary post 14 connected to the movable post 13 through the horizontal members 11, 12; a sample scale 20 supported by the movable post 13; a lever 30 having an elastic fulcrum 31 and a point of force 32, the point of force 32 being connected to the movable post 13 through an elastic connection fulcrum 51 positioned between the upper and lower horizontal members 11, 12; and a load sensing portion 40 to which a load on the sample scale 20 is to be transmitted by the lever 30, and this top scale balance is characterized in that, out of the upper and lower horizontal members 11, 12, the horizontal member nearer to the elastic connection fulcrum 51 (the lower horizontal member 12 in FIG. 1) is greater in rigidity than the other horizontal member (the upper horizontal member 11 in FIG. 1).

The rigidity of the horizontal member 11 or 12 also includes the rigidity of each of the flexible portions 11a, 11b or 12a, 12b formed at both ends thereof, and more precisely includes the rigidity of the movable or stationary post 13 or 14 in the horizontal direction. Accordingly, the first invention above-mentioned also includes an arrangement in which the rigidities of the horizontal members 11, 12 themselves including the rigidities of the flexible portions 11a, 11b, 12a, 12b at both ends thereof, are substantially equal to each other and in which the movable or stationary post 13 or 14 connected to one ends of the horizontal members 11, 12 is weakened such that the rigidity of the horizontal member further from the elastic connection fulcrum 51 (the upper horizontal member 11 in FIG. 1) is apparently weakened as compared with the rigidity of the other horizontal member (the lower horizontal member 12 in FIG. 1).

Figure 5:
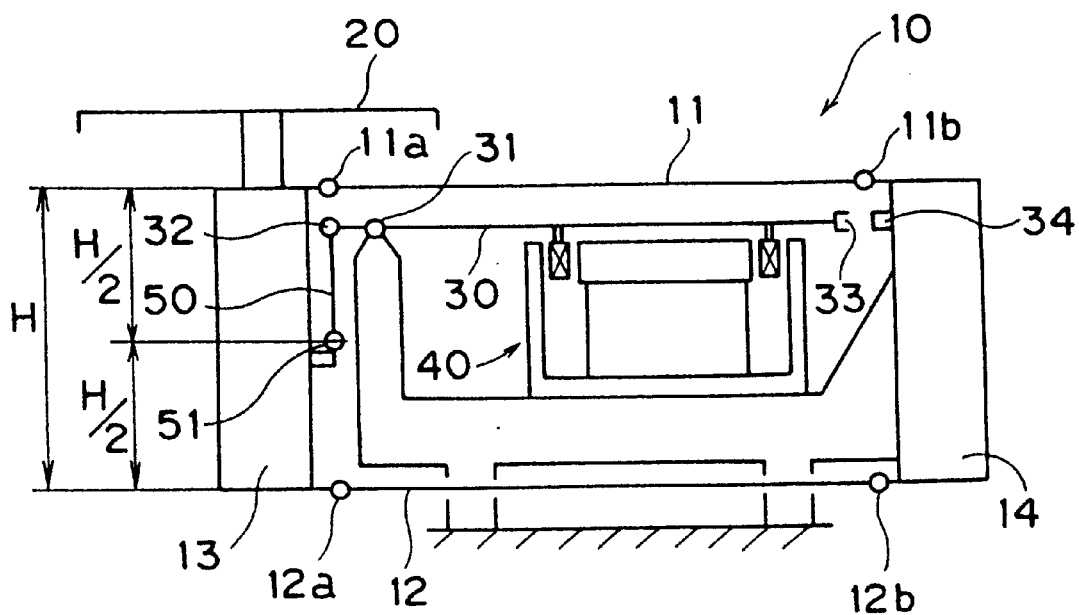
FIG. 5 is a side view of a mechanism illustrating an embodiment in which a second invention is applied to an electronic balance of the electromagnetic equilibrium type.

To achieve the object above-mentioned, a second invention provides a top scale balance which comprises, as shown in FIG. 5: a Roberval's chain 10 and a lever 30 identical to those of the first invention, and in which the point of force 32 of the lever 30 is connected to the movable post 13 through the elastic connection fulcrum 51, and this top scale balance is characterized in that the upper and lower horizontal members 11, 12 are substantially the same in rigidity and in that the vertical position of the elastic connection fulcrum 51 is located in the center between the upper and lower horizontal members 11, 12.

The present invention has been accomplished based on the finding that, in a conventional top scale balance, the offset position error is increased when the lever ratio exceeds a certain limit and it is because of a change in lever ratio due to an offset placed load that the error amount varies with a change in the magnitude of the offset placed load.

By adopting the arrangement of each of the first and second inventions above-mentioned, the present invention is arranged to eliminate a change in lever ratio due to an offset placed load, thereby to achieve the predetermined object.

Figure 9A:
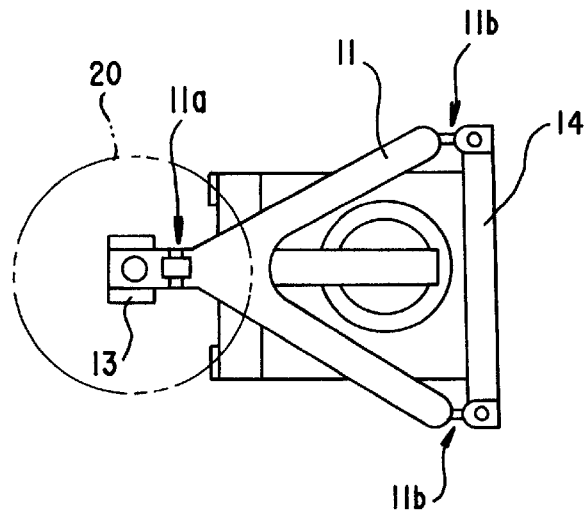
FIG. 9(A) and FIG. 9(B) are plan and side views of the general arrangement of a top scale balance having a Roberval's chain and a lever.
Figure 9B:
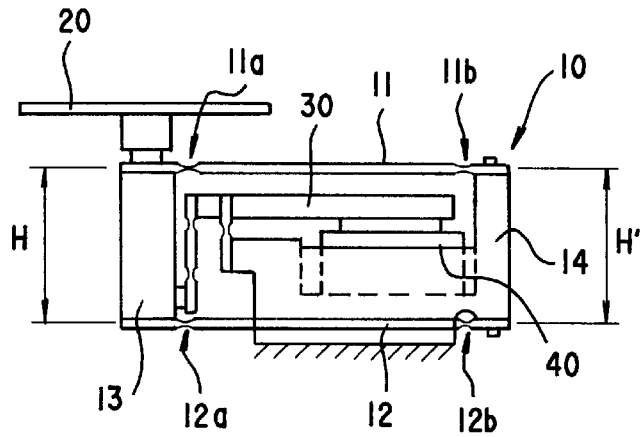
Figure 10:
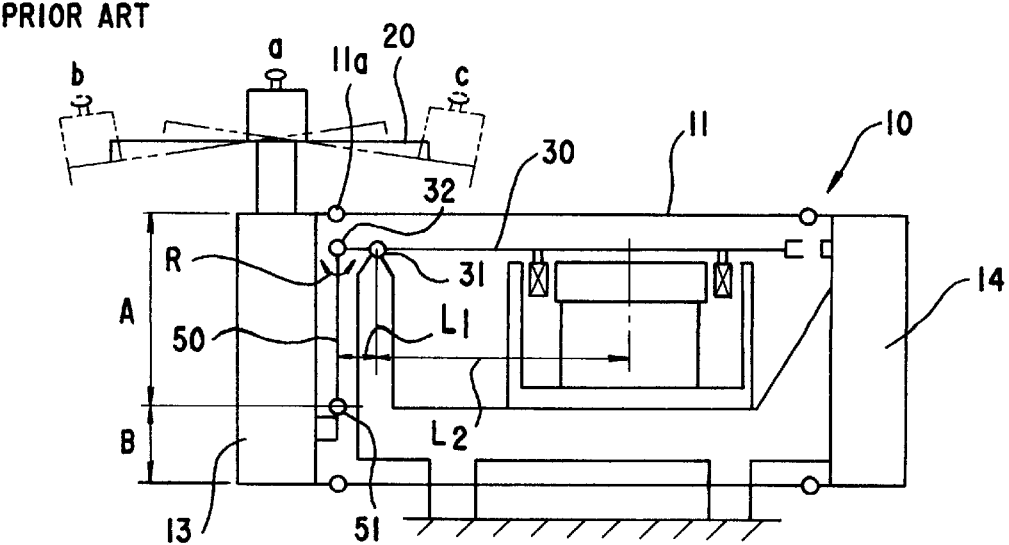
FIG. 10 is a side view illustrating the mechanism of the balance in FIG. 9.
Figure 12:
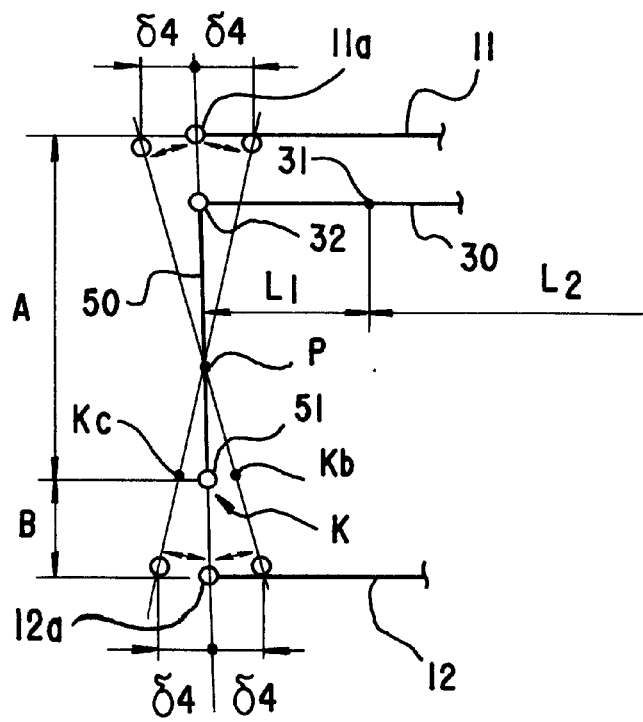
FIG. 12 is an enlarged view of main portions of the mechanism in FIG. 10 and illustrates how a variety of component elements are displaced by an offset placed load.

With reference to FIGS. 10 and 12, the following description will discuss (i) the fact that the lever ratio varies with an offset placed load and (ii) how such a change in lever ratio due to the offset placed load can be eliminated by the arrangement of each of the first and second inventions. FIG. 10 is a side view illustrating the mechanism of a top scale balance in which a movable post 13 of a Roberval's chain 10 is connected to a point of force 32 of a lever 30 through an elastic connection fulcrum 51, while FIG. 12 is an enlarged view of main portions in FIG. 9.

In FIG. 10, when a load on the sample scale 20 is moved from a position a to a position b, a tensile force is exerted to the upper horizontal member 11 of the Roberval's chain 10, causing the horizontal member 11 to be expanded. On the other hand, a compressive force is exerted to the lower horizontal member 12, causing the horizontal member 12 to be contracted. When the load is moved to a position c, the upper horizontal member 11 is contracted and the lower horizontal member 12 is expanded.

In a conventional top scale balance of the type above-mentioned, the upper and lower horizontal members 11, 12 are substantially the same in rigidity, and the expansion amount of the horizontal member 11 or 12 is substantially equal to the contraction amount of the horizontal members 12 or 11. Such an expansion/contraction amount is referred to as $\delta 4$. Dependent on the position of an offset placed load, component elements are displaced, as shown in FIG. 12, around the median point P of a line connecting a flexible portion 11a of the upper horizontal member 11 to the corresponding flexible portion 12a of the lower horizontal member 12.

Generally, as the distance between the point of force 32 and the elastic connection fulcrum 51 is longer, the precision is better. Accordingly, the vertical position of the elastic connection fulcrum 51 is lower than the center position between the upper and lower horizontal members 11, 12. That is, A is greater than B. Accordingly, the elastic connection fulcrum 51 is moved from a position K at the time when a load is placed on the sample scale 20 at the center a thereof, to a position Kb at the time when the load is moved to the position b, and to a position Kc at the time when the load is moved to the position C.

Figure 11:
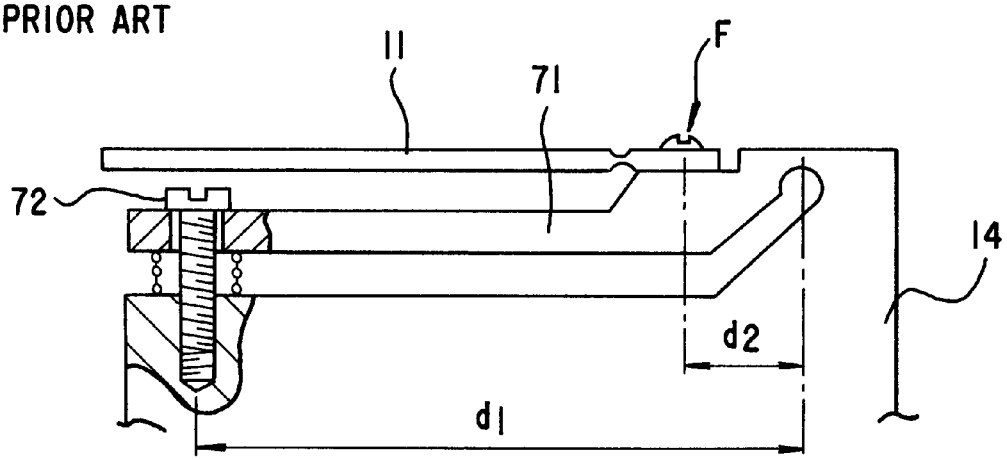
FIG. 11 illustrates a conventional mechanism for adjusting, with the use of an adjusting arm, the parallelism of a Roberval's chain.

When the elastic connection fulcrum 51 is moved to the position Kb, the distance $L_1'$ between the point of force and the elastic fulcrum 31 of the lever 30 is smaller than the distance $L_1$ and the lever ratio changes from $L_1/L_2$ to $L_1'/L_2$ (in which $L_1'$ is smaller than $L_1$). On the other hand, when the elastic connection fulcrum 51 is moved to the position Kc, $L_1$ is increased and the lever ratio is changed to $L_1''/L_2$ (in which $L_1''$ is greater than $L_1$). It is now supposed that a load within the weighing range of a balance, e.g., a load of 2 kgs, is actually moved on the sample scale 20. Then, an adjustment mechanism as shown in FIG. 11 is operated to adjust the parallelism of the Roberval's chain 10 such that the weight display value undergoes no change. Thus, there is provided a state where the offset position error is equal to 0. In this case, it means that the error due to the change in lever ratio above-mentioned is corrected by putting the parallelism of the Roberval's chain 10 out of order. Then, it is now supposed that, after completion of such an adjustment, a load having a different weight, e.g., 4 kgs, is moved on the sample scale 20. In this case, when the load of 4 kgs is moved by a distance equal to a half of the distance by which the load of 2 kgs was moved, the moment to the sample scale 20 becomes equal to that for the load of 2 kgs, and the tensile force and the compressive force exerted to the upper and lower horizontal members 11, 12 become equal to each other, and the movement amounts of the point K are also equal to each other. In this case, however, since the load is doubled, the error due to a change in lever ratio is doubled. Accordingly, the amount of correction made for the load of 2 kgs is not sufficient for the load of 4 kgs, thus producing an error. Actually, the moving distance of the load of 4 kgs is equal to the distance by which the load of 2 kgs is moved. Thus, the error for the load of 4 kgs is further increased.

The foregoing has discussed the reason of why the offset position error is increased when the lever ratio becomes great and the distance $L_1$ is as short as about 1 mm or less.

In view of the foregoing, the present invention is arranged to eliminate the movement of the point K (elastic connection fulcrum 51) upon application of an offset placed load, thereby to prevent the lever ratio from being changed due to the offset placed load.

Figure 3:
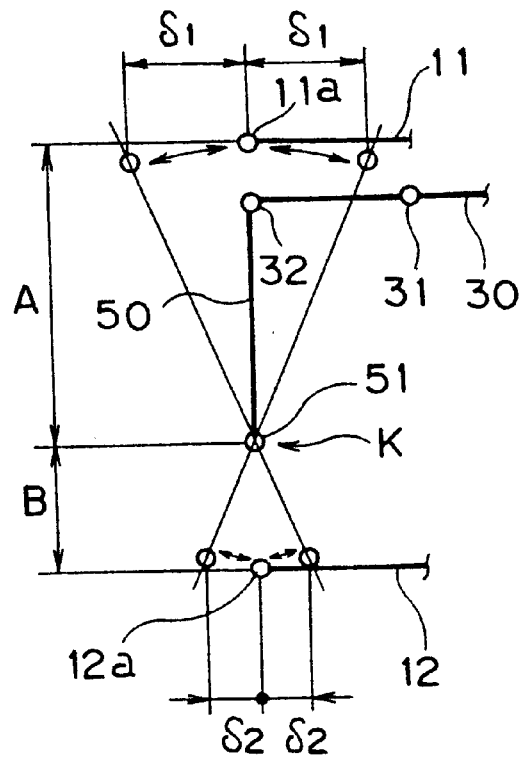
FIG. 3 is a view illustrating the operation made at the time when an offset placed load is applied to the mechanism in FIG. 1.

More specifically, according to the first invention, there is used an arrangement in which the elastic connection fulcrum 51 is located as positionally shifted toward one of the horizontal members as conventionally done, and in which the horizontal member nearer to the elastic connection fulcrum 51 is higher in rigidity than the other horizontal member. Accordingly, the amounts of expansion and contraction of the upper and lower horizontal members or the lower and upper horizontal members are different from each other, thus preventing the point K from being moved. When the lower horizontal member 12 is nearer to the elastic connection fulcrum 51 as in the example above-mentioned, the lower horizontal member 12 is higher in rigidity than the upper horizontal member 11. In this case, there is established a relationship of $\delta_1 > \delta_2$, as shown in FIG. 3, in which $\delta_1$ is the amount of expansion or contraction of the upper horizontal member 11 due to an offset placed load and $\delta_2$ is the amount of contraction or expansion of the lower horizontal member 12 due to the offset placed load. Thus, the amount of movement of the point K is small. Theoretically, the movement of the point K is eliminated when the ratio between $\delta_1$ and $\delta_2$ is made equal to the ratio between A and B as follows;

$$\delta_1/\delta_2 = A/B \tag{1}$$

The following description will prove the foregoing.

Figure 4:
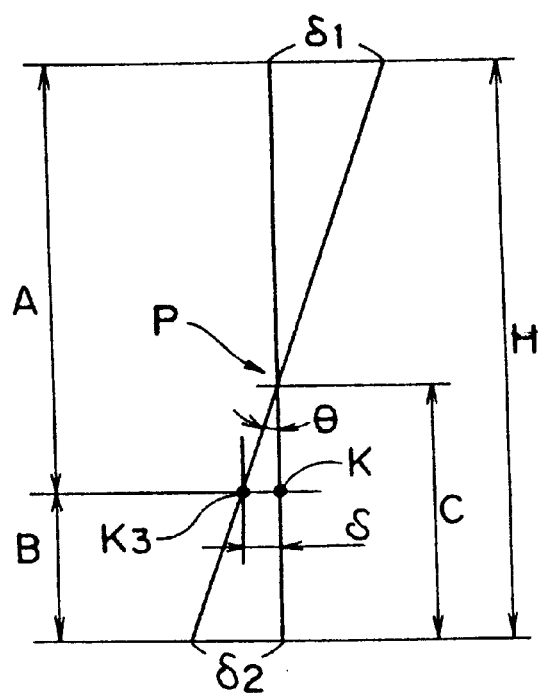
FIG. 4 is a view geometrically illustrating the conditions under which the amount of movement of the elastic connection fulcrum 51 due to an offset placed load, is brought to zero in the mechanism in FIG. 1.

As geometrically shown in FIG. 4, the following relationships are established:

$$\delta = \theta(C - B) \tag{2}$$

$$\theta = \frac{\delta_1 + \delta_2}{H} \tag{3}$$

-continued $$\frac{C}{\delta_2} = \frac{H - C}{\delta_1} \therefore C = \frac{\delta_2}{\delta_1 + \delta_2} H \tag{4}$$

$$\therefore \delta = \frac{\delta_1 + \delta_2}{H} \cdot \left( \frac{\delta_2}{\delta_1 + \delta_2} H - B \right) = \delta_2 - \frac{\delta_1 + \delta_2}{H} B \tag{5}$$

wherein C is the distance between the median point P which is the center of displacement of respective component elements, and the lower horizontal member 11, θ is the angle at which the line connecting a flexible portion 11a of the upper horizontal member 11 at the side of the movable post 13, to a flexible portion 12a of the lower horizontal member 12 at the side of the movable post 13, is inclined with respect to the perpendicular line by the offset placed load, and δ is the amount of movement of the point K at that time.

In order that the movement of the point K due to the offset placed load is equal to 0, 0 is put into δ in the equation (5) and the following equations are then established:

$$\delta_2 = \frac{B}{H}(\delta_1 + \delta_2) \tag{6}$$

$$\frac{B}{H} = \frac{\delta_2}{\delta_1 + \delta_2}, \therefore \delta_2 A = \delta_1 B \tag{7}$$

Accordingly, when the equation (1) is satisfied, the movement of the point K is eliminated.

Also, by weakening the rigidity of the movable or stationary post 13 or 14 in the horizontal direction, the upper horizontal member 11 further from the elastic connection fulcrum 51 can apparently be lowered in rigidity than the lower horizontal member 12. Accordingly, when the rigidity of the movable or stationary post 13 or 14 is intentionally weakened with no difference in rigidity between the upper and lower horizontal members 11, 12, there are produced effects equivalent to those produced by the arrangement in which the horizontal member 11 itself is weakened in rigidity than the horizontal member 12 itself.

Figure 6:
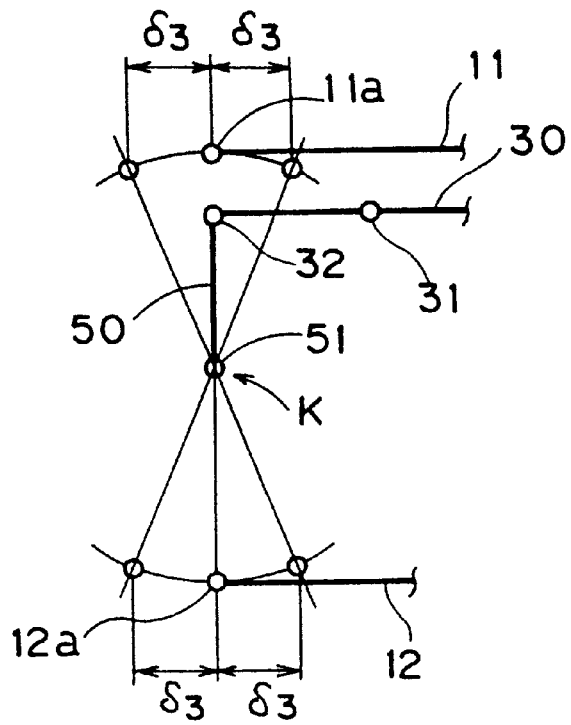
FIG. 6 is a view illustrating the operation made at the time when an offset placed load is applied to the mechanism in FIG. 5.

On the other hand, according to the second invention, there is used an arrangement in which the upper and lower horizontal members 11, 12 are substantially the same in rigidity as conventionally done, and in which the vertical position of the elastic connection fulcrum 51 is located in the center between the upper and lower horizontal members 11, 12. Accordingly, as shown in FIG. 6, the amount $\delta_3$ of expansion or contraction of the upper or lower horizontal member 11, 12 due to the offset placed load is equal to the amount $\delta_3$ of contraction or expansion of the lower or upper horizontal member 12, 11 due to the offset placed load, and the elastic connection fulcrum 51 (the point K) is located in the center point at which component elements are displaced due to such expansion or contraction. This eliminates the movement of the point K.

DESCRIPTION OF PREFERRED EMBODIMENTS

FIG. 1 is a side view of the mechanism of a preferred embodiment in which a first invention is applied to an electronic balance of the electromagnetic equilibrium type.

A Roberval's chain 10 has a basic structure, equivalent to a conventional one shown in FIGS. 9 and 10, in which a movable post 13 is connected to a stationary post 14 through upper and lower horizontal members 11, 12 each provided at both ends thereof with flexible portions 11a, 11b or 12a, 12b and in which a sample scale 20 is supported by the movable post 13.

Likewise in the conventional balance, a load acting on the movable post 13 is transmitted, through a lever 30 supported by an elastic fulcrum 31, to an electromagnetic force generating device 40 serving as a load sensing portion. More specifically, a point of force 32 disposed at one end of the lever 30 is connected to the movable post 13 through an elastic connection fulcrum 51 by a connecting piece 50. A force coil 42 of the electromagnetic force generating device 40 is secured to the lever 30 at the side thereof opposite to the point of force 32 with respect to the elastic fulcrum 31. In the electromagnetic force generating device 40, the force coil 42 secured to the lever 30 is movably disposed in a static magnetic field generated by a magnetic circuit 41 mainly comprising a permanent magnet 41a. The displacement of the lever 30 is detected by a displacement sensor 34 for detecting the position of a slit 33 provided in the other end of the lever 30. The electric current flowing in the force coil 42 is controlled such that the result of displacement detection is zero at all times. The load on the sample scale 20 is detected according to the magnitude of this electric current.

The vertical position of the elastic connection fulcrum 51 is nearer to the lower horizontal member 12 of the Roberval's chain 10 than to the upper horizontal member 11. That is, A is greater than B in which A is the vertical distance between the upper horizontal member 11 and the elastic connection fulcrum 51 and B is the vertical distance between the lower horizontal member 12 and the elastic connection fulcrum 51.

Figure 2:
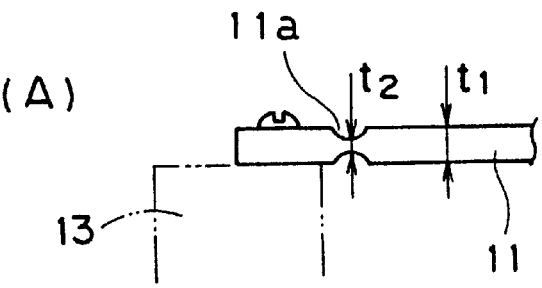
FIGS. 2(A)–(D) are views illustrating the arrangement of a specific example in which the upper horizontal member 11 is lower in rigidity than the lower horizontal member 12 in the embodiment in FIG. 1.
Figure 2:
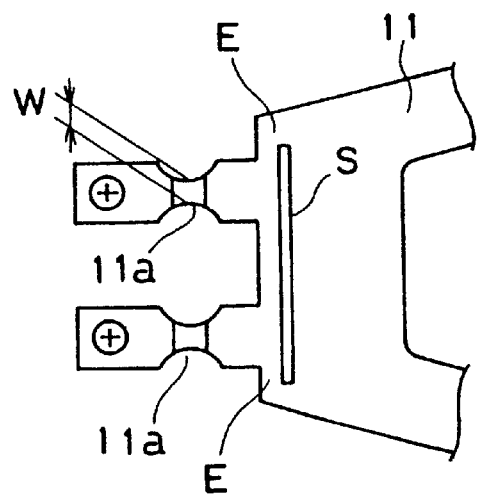
Figure 2C:
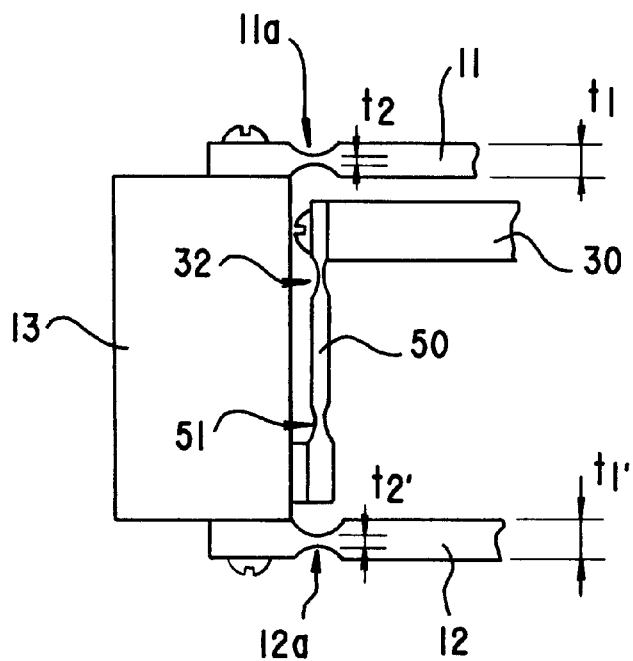
Figure 2D:
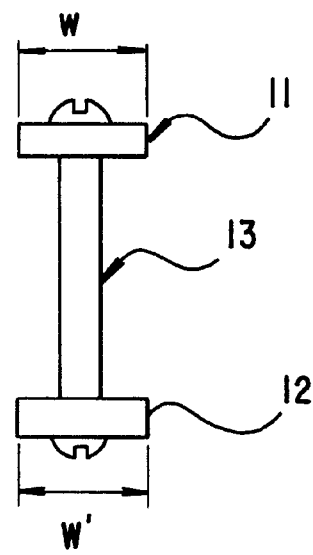

The lower horizontal member 12 is higher in rigidity than the upper horizontal member 11. More specifically, as shown in FIG. 2(A) and FIG 2(C), the upper horizontal member 11 is smaller in the thickness $t_1$ of the main thickness $t_1'$ of the lower horizontal member 12, or the upper horizontal member 11 is smaller in the thickness $t_2$ of each of the flexible portions than the thickness $t_2'$ of the lower horizontal member 12. Further, the upper horizontal member 11 is narrower in the width w of the main body than is the w' of the main body of the lower horizontal member 12, as shown in FIG. 2(D).

Alternately, the upper and lower horizontal members 11, 12 are made equal in these thicknesses $t_1$ and $t_2$ to each other while a slit S is formed in only the upper horizontal member 11 to form an elastic portion E, as shown in FIG. 2(B) which is a partial plan view of the upper horizontal member 11.

Alternately, the width w of each of the flexible portions 11a, 11b of the upper horizontal member 11 is made smaller than that of each of the flexible portions 12a, 12b of the lower horizontal member 12 (See FIG. 2(B)).

The ratio in rigidity between the upper and lower horizontal members 11, 12 is set such that $$\delta_1/\delta_2 = A/B \qquad (8)$$

in which $\delta_2$ is the expansion/contraction amount of the upper horizontal member 11 due to the offset placed load and $\delta_2$ is the contraction/expansion amount of the lower horizontal member 12 due to the offset placed load.

In the embodiment above-mentioned, it is now supposed that the equation (8) is satisfied. As shown in FIG. 3, even though the upper and lower horizontal members 11, 12 are expanded or contracted due to the offset placed load, the elastic connection fulcrum 51 is hardly moved. Thus, even though the lever ratio is increased and the distance between the elastic fulcrum 31 and the point of force 32 of the lever 30 is reduced to about 1 mm or less, the offset placed load is not increased.

The following description will discuss the arrangement of a second invention as also applied to an electronic balance of the electromagnetic equilibrium type. FIG. 5 is a side view illustrating the mechanism of the second invention.

In this embodiment, the basic structure of the mechanism relating to a Roberval's chain 10 and to a lever 30, and a load sensing portion 40 and the like is the same as that of the embodiment above-mentioned. Therefore, like parts are designated by like reference numerals used in FIG. 1 and the description thereof is here omitted.

The embodiment shown in FIG. 5 is characterized in that upper and lower horizontal members 11, 12 of the Roberval's chain 10 are substantially the same in rigidity and that the vertical position of an elastic connection fulcrum 51 is located in the center of the distance H between the upper and lower horizontal members 11, 12.

According to the arrangement in FIG. 5, the amounts of expansion and contraction of the upper and lower horizontal members 11, 12 due to an offset placed load are equal to each other and now referred to as $\delta_3$. As shown in FIG. 6, the elastic connection fulcrum 51 is hardly moved due to such expansion/contraction $\delta_3$.

Figure 7:
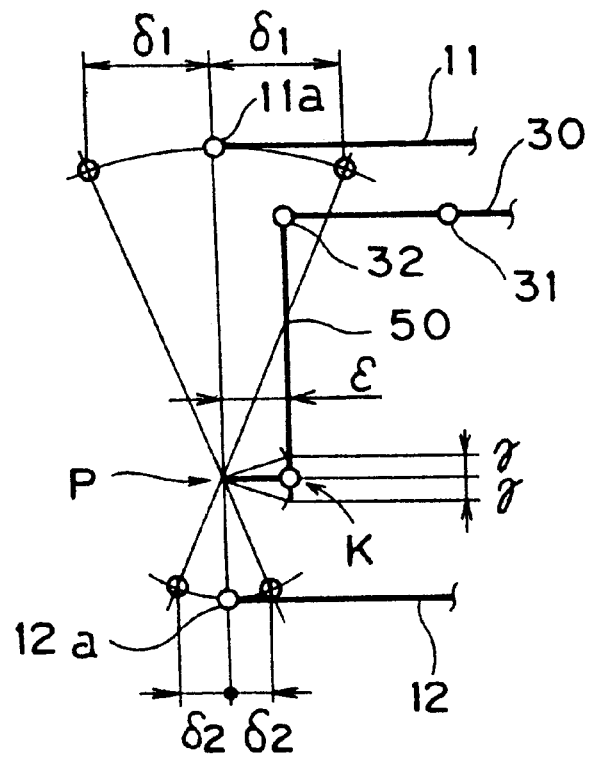
FIG. 7 is a view illustrating an operation of another embodiment of the present invention in which the elastic connection fulcrum 51 and the point of force 32 of the lever 30 are disposed as positionally shifted from the perpendicular line which connects corresponding flexible portions 11a, 12a of the upper and lower horizontal members to each other.

In each of the embodiments above-mentioned, both the elastic connection fulcrum 51 and the point of force 32 of the lever 30, are located in the perpendicular line which connects the corresponding flexible portions 11a, 12a of the upper and lower horizontal members 11, 12 to each other. This arrangement is ideal in view of the positional relationship. However, the present invention is not always required to be arranged in the manner above-mentioned. As a matter of fact, the elastic connection fulcrum 51 and the point of force 32 may positionally be shifted by $\epsilon$ from the perpendicular line which connects the corresponding upper and lower flexible portions 11a, 12a to each other, as shown in FIG. 7. More specifically, in order to prepare a variety of types of scales/balances of the same series having different weighing ranges, each scale/balance manufacturer generally provides scales/balances respectively having a variety of lever ratios according to the weighing ranges. It is therefore difficult to apply the ideal positional relationship above-mentioned to each of all the types of scales/balances. Thus, it is more preferable to select such a positional relationship with attention so placed as to obtain the desired resolution of weighing range/sensitivity which is the most difficult function to achieve.

It is now supposed that there is adopted the positional relationship as shown in FIG. 7. The point K at which the elastic connection fulcrum 51 is positioned, is vertically moved by $\gamma$ when the upper and lower horizontal members 11, 12 are expanded/contracted due to an offset placed load. However, since the lever 30 is maintained at a constant posture by an electromagnetic force generated by the electromagnetic force generating device 40, it is the movable post 13 that is vertically moved. When the movable post 13 is vertically moved, the upper and lower horizontal members 11, 12 of the Roberval's chain 10 are inclined at the same angle such that the parallelism between the horizontal members 11, 12 does not get out of order. Further, the restoring forces of the flexible portions 11a, 11b, 12a, 12b of the Roberval's chain 10 are in proportion to the inclination of the horizontal members 11, 12 and are not affected so much by the amount of a load. After all, according to the vertical movement amount of the movable post 13 (which is increased in proportion to the moment on the sample scale 20), the parallelism of the Roberval's chain 10 can be adjusted such that the error is brought to zero. The foregoing can also be applied to each of the embodiments shown in FIGS. 1 and 5. Further, it was made sure that no problem was encountered in the range of $\epsilon \leq$ about 3 mm.

It is a matter of course that the expansion/contract ion amounts $\delta_1$, $\delta_2$, $\delta_3$ of the upper and lower horizontal members 11, 12 of the Roberval's chain 10 in the embodiments above-mentioned, must include not only the expansion/contraction of the horizontal members 11, 12 themselves, but also the flexure of the flexible portions 11a, 11b, 12a, 12b. Accordingly, the rigidities of the upper and lower horizontal members 11, 12 also include the rigidities of the flexible portions 11a, 11b, 12a, 12b.

The substantial rigidity of each of the horizontal members 11, 12 includes an influence of the rigidity of the movable or stationary post 13 or 14 to which the horizontal members 11, 12 are fixed, when the rigidity of the movable or stationary post 13 or 14 is too weak to be disregarded.

As a modification of the first invention in which there is provided a difference in rigidity between the upper and lower horizontal members 11, 12, the movable or stationary post 13 or 14 may be reduced in rigidity such that the rigidity of the horizontal member further from the elastic connection fulcrum 51, i.e., the rigidity of the upper horizontal member 11 in the embodiment shown in FIG. 1, is made apparently weaker than the rigidity of the lower horizontal member 12. Such a modification can produce the operational effects equivalent to those produced by the arrangement shown in FIGS. 1 and 2. The first invention also includes such an arrangement.

Figure 8A:
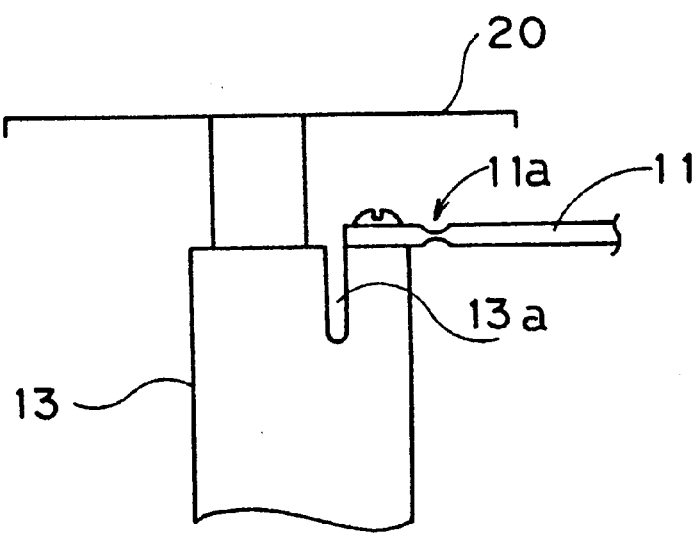
FIG. 8(A) and FIG. 8(B) are views illustrating the specific arrangement of a modification of the first invention.
Figure 8:
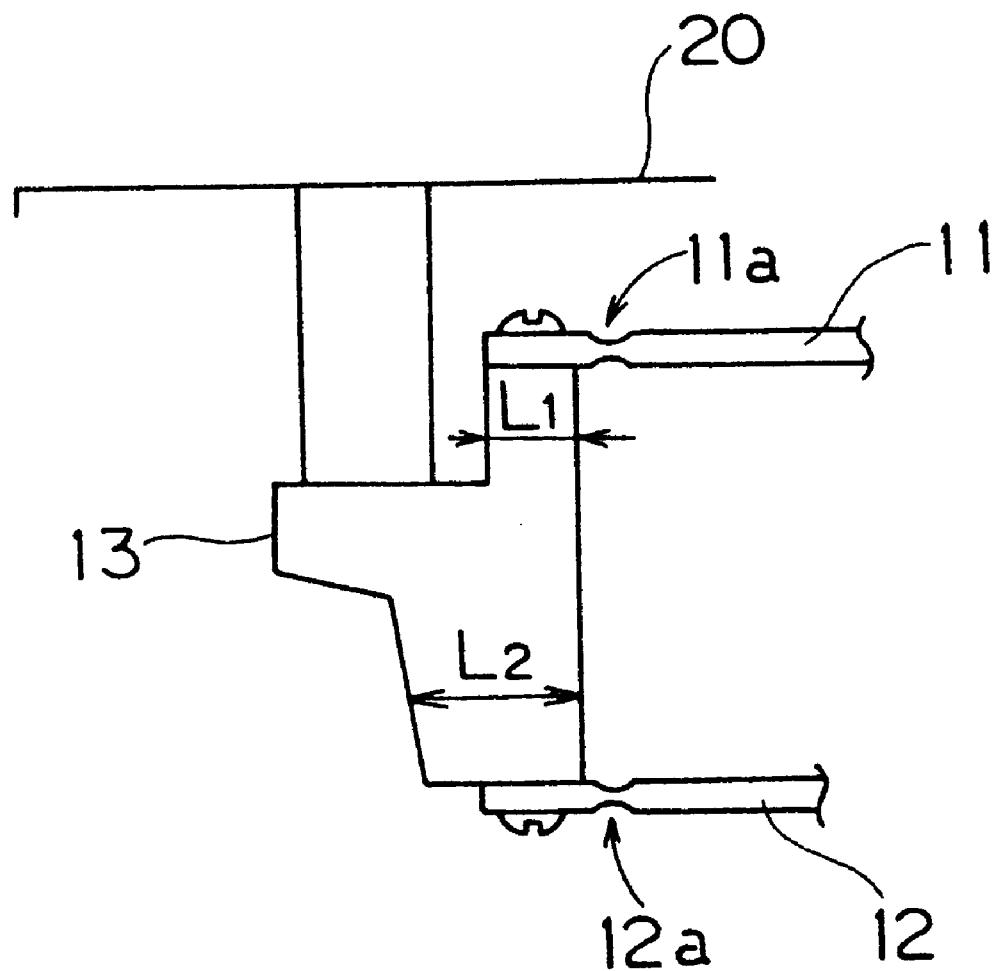

FIG. 8(A) and FIG. 8(B) show the arrangements of a specific example in which the rigidity of the upper horizontal member 11 is apparently weakened as compared with the lower horizontal member 12 by weakening the rigidity of the movable post 13.

In FIG. 8(A), a slit 13a is perpendicularly formed in the movable post 13 in the vicinity of its portion to which the upper horizontal member 11 is secured. This weakens the rigidity of the movable post 13 in a horizontal direction.

In FIG. 8(B), the movable post 13 is formed slenderly in vicinities of its portions to which the upper horizontal member 11 and the lower horizontal member 12 are secured respectively. In this case, there is established a relationship $L_1 < L_2$. This also weakens the rigidity of the movable post 13 in a horizontal direction.

It will be recognized that there are other structures in order to weaken the rigidity of a movable post 13 or a stationary post 14. For example, by making the movable post 13 or stationary post 14 thin, it would be possible to eliminate the movement of the point K.

In the arrangement of the first invention shown in FIG. 1, the lever 30 is disposed at a position nearer to the upper horizontal member 11 than to the lower horizontal member 12. However, the lever 30 may also be disposed at a position nearer to the lower horizontal member 12. In such an arrangement, the elastic connection fulcrum 51 through which the point of force 32 is connected to the movable post 13, is advantageously disposed at a position nearer to the upper horizontal member 11 in view of precision. Accordingly, the upper horizontal member 11 is required to be increased in rigidity as compared with the lower horizontal member 12. It is a matter of course that the first invention also includes such an arrangement.

Further, in each of the embodiments above-mentioned, the present invention is applied to an electronic balance of the electromagnetic equilibrium type using the electromagnetic force generating device 40 as a load sensing portion. It is a matter of course that the present invention can also be applied to an electronic balance having a load sensing portion of other type such as a load cell or the like.

What is claimed is:

1. A top scale balance comprising: a Roberval's chain having (i) a single upper and a single lower horizontal member, wherein the upper and lower members are parallel and wherein the upper and lower members are each provided at both ends thereof with flexible portions, (ii) a movable post and (iii) a stationary post connected to said movable post through said horizontal members; a sample scale supported by said movable post; a lever mechanism having an elastic fulcrum and a point of force, said point of force being connected to said movable post through an elastic connection fulcrum positioned between said upper and lower horizontal members; and a load sensing portion to which a load on said sample scale is to be transmitted by said lever mechanism, wherein one of said horizontal members nearer to said elastic connection fulcrum is more rigid than the other horizontal member by virtue solely of the relative construction of each of the members.

2. A top scale balance according to claim 1, wherein said horizontal member nearer to said elastic connection fulcrum is greater in the thickness of main body than said other horizontal member.

3. A top scale balance according to claim 1, wherein said horizontal member nearer to said elastic connection fulcrum is greater in the thickness of each of elastic portions at both ends than said other horizontal member.

4. A top scale balance according to claim 1, wherein said horizontal member nearer to said elastic connection fulcrum is greater in width than said other horizontal member.

5. A top scale balance according to claim 1, wherein
said upper and lower horizontal members are the same in the thickness of main body and in the thickness of each of flexible portions at both ends, and
a slit is formed only in the horizontal member furthest from said elastic connection fulcrum such that said horizontal member is flexible.

6. In a top scale balance comprising: a Roberval's chain having (i) two, upper and lower, parallel horizontal members each provided at both ends thereof with flexible portions, (ii) a movable post and (iii) a stationary post connected to said movable post through said horizontal members; a sample scale supported by said movable post; a lever mechanism having an elastic fulcrum and a point of force, said point of force being connected to said movable post through an elastic connection fulcrum positioned between said upper and lower horizontal members; and a load sensing portion to which a load on said sample scale is to be transmitted by said lever mechanism, wherein said upper and lower horizontal members are substantially the same in rigidity, and said stationary post is weakened in rigidity such that the horizontal member farthest from said elastic connection fulcrum moves more in the horizontal direction in response to an offset placed load than the other horizontal member, and wherein the elastic connection fulcrum does not move in response to an offset placed load.

7. In a top scale balance comprising: a Roberval's chain having (i) two, upper and lower, parallel horizontal members each provided at both ends thereof with flexible portions, (ii) a movable post and (iii) a stationary post connected to said movable post through said horizontal members; a sample scale supported by said movable post; a lever mechanism having an elastic fulcrum and a point of force, said point of force being connected to said movable post through an elastic connection fulcrum positioned between said upper and lower horizontal members; and a load sensing portion to which a load on said sample scale is to be transmitted by said lever mechanism, wherein said upper and lower horizontal members are substantially the same in rigidity, and said movable post is weakened in rigidity such that the horizontal member farthest from said elastic connection fulcrum moves more in the horizontal direction in response to an offset placed load than the other horizontal member.

8. A top scale balance comprising: a Roberval's chain having (i) two, upper and lower, parallel horizontal members each provided at both ends thereof with flexible portions, (ii) a movable post and (iii) a stationary post connected to said movable post through said horizontal members; a sample scale supported by said movable post; a lever mechanism having an elastic fulcrum and a point of force, said point of force being connected to said movable post through an elastic connection fulcrum positioned between said upper and lower horizontal members; and a load sensing portion to which a load on said sample scale is to be transmitted by said lever mechanism, wherein said upper and lower horizontal members are substantially the same in rigidity, and said elastic connection fulcrum is connected to the movable post at the center between said upper and lower horizontal members.

9. In a top scale balance comprising: a Roberval's chain having (i) two, upper and lower, parallel horizontal members each provided at both ends thereof with flexible portions, (ii) a movable post and (iii) a stationary post connected to said movable post through said horizontal members; a sample scale supported by said movable post; a lever mechanism having an elastic fulcrum and a point of force, said point of force being connected to said movable post through an elastic connection fulcrum positioned between said upper and lower horizontal members; and a load sensing portion to which a load on said sample scale is to be transmitted by said lever mechanism, wherein the amount of expansion and contraction of the upper horizontal member in response to an offset placed load is given by $\delta_1$, and the expansion and contraction of the lower horizontal member in response to the same offset load is given by $\delta_2$, and the distance from the upper horizontal member to the elastic connection fulcrum is given by A, and the distance from the lower horizontal member to the elastic connection fulcrum is given by B, and wherein a first rigidity of the upper horizontal member and a second rigidity of the lower horizontal member are selected such that in response to an offset load $(\delta_1/\delta_2)$ is approximately equal to $(A/B)$.

\* \* \* \* \*